Oct. 20, 1959 C. E. BRANICK 2,909,060
DEVICE FOR DETECTING PLY SEPARATION IN PNEUMATIC TIRE CASINGS
Filed July 30, 1958 2 Sheets-Sheet 1
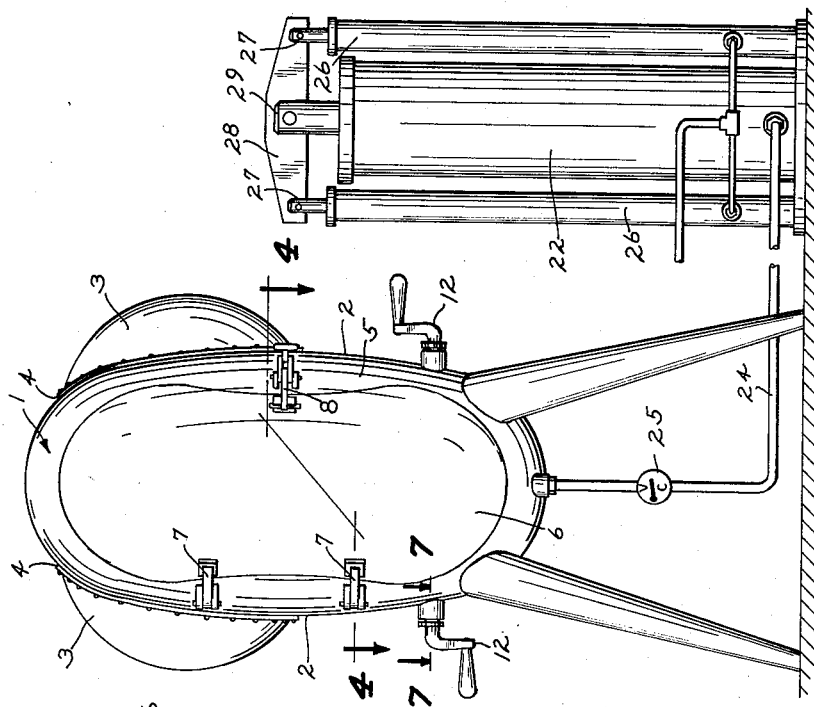
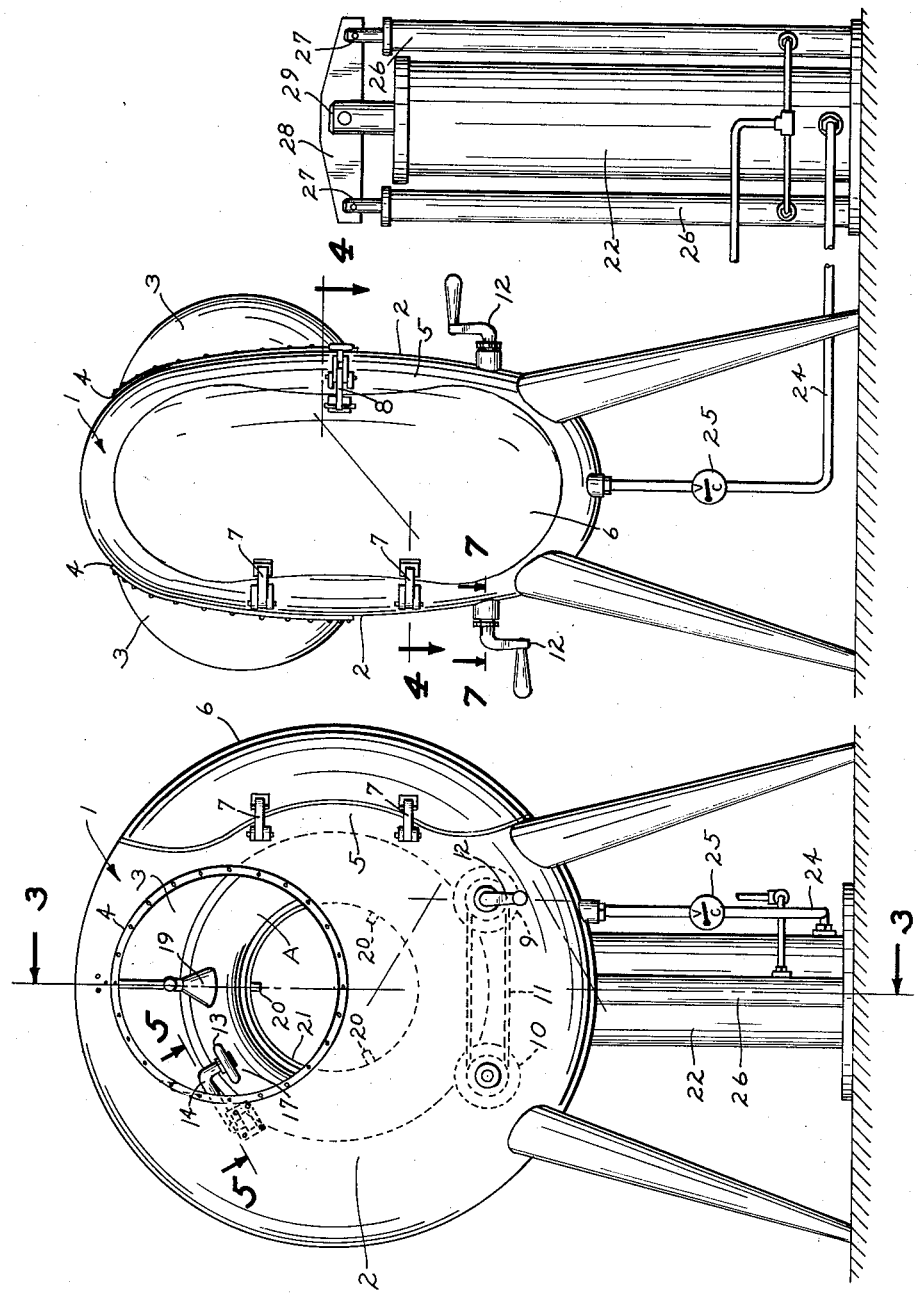
INVENTOR.
CHARLES E. BRANICK
BY
Merchant & Merchant
ATTORNEYS Oct. 20, 1959 C. E. BRANICK 2,909,060
DEVICE FOR DETECTING PLY SEPARATION IN PNEUMATIC TIRE CASINGS
Filed July 30, 1958 2 Sheets-Sheet 2
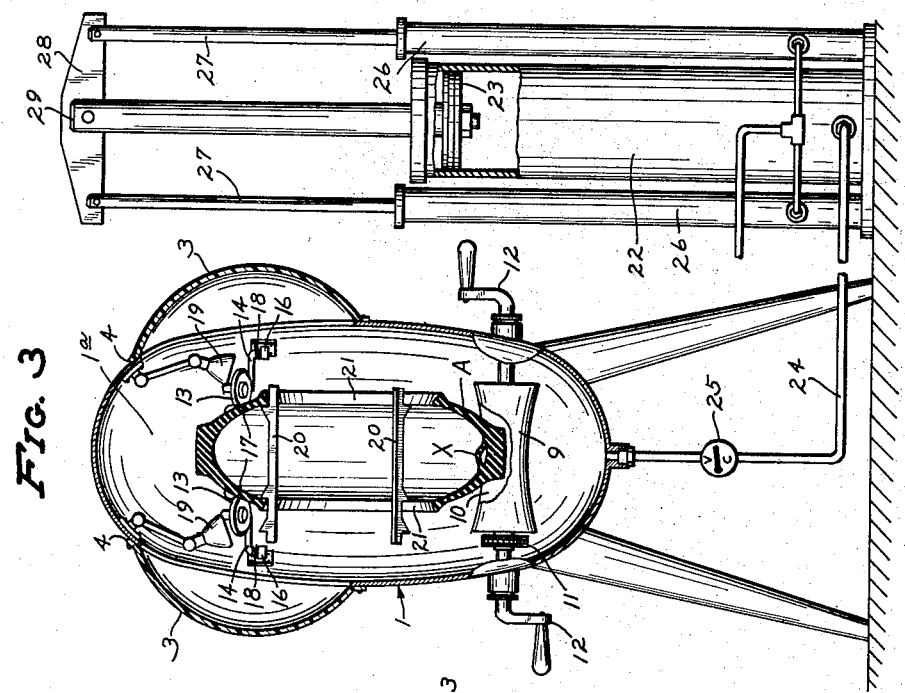
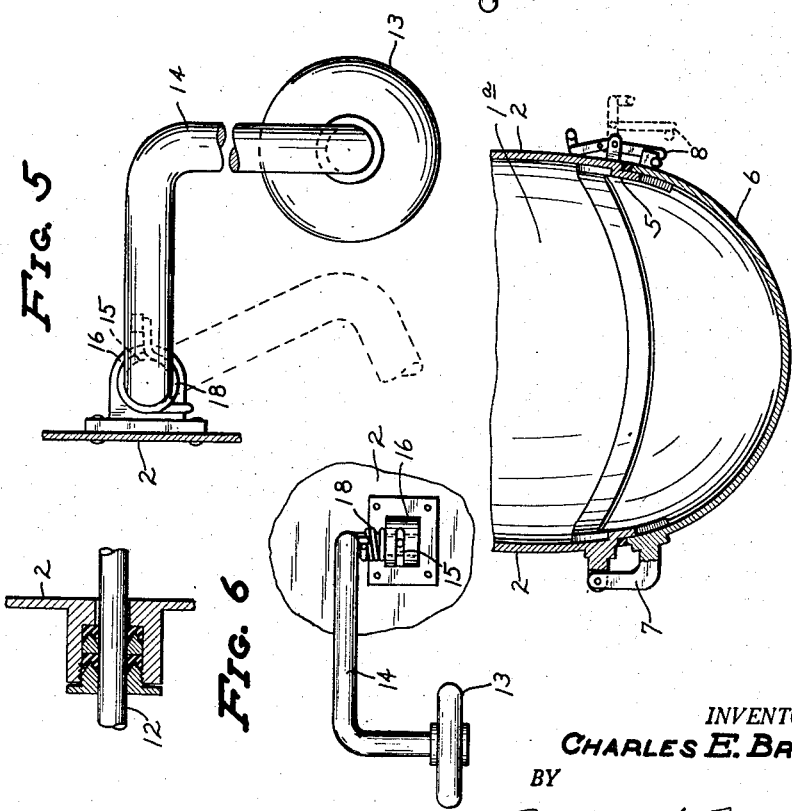
INVENTOR.
CHARLES E. BRANICK
BY
Merchant & Merchant
ATTORNEYS

2,909,060
DEVICE FOR DETECTING PLY SEPARATION IN PNEUMATIC TIRE CASINGS

Charles E. Branick, Fargo, N. Dak.

Application July 30, 1958, Serial No. 752,010

2 Claims. (Cl. 73—146)

My invention relates generally to devices for inspecting pneumatic tire casings and more particularly to devices for detecting imperfections and damaged areas of the cord carcass of pneumatic tires.

The inner portion of a pneumatic tire casing, upon which the tread and side wall rubber is vulcanized, is called the carcass. This carcass is formed from a plurality of criss-crossed layers of cord (cotton, rayon, nylon and so forth) which extend from bead to bead. The several layers comprising the carcass are bonded or vulcanized together in a rubber-like material which permits some relative movement of the overlying layers of cords as the cross sectional shape of the tire is altered in use. All too commonly, separation between one or more of the layers or plies of such cords occurs during usage; and it is extremely difficult to detect such separation if it has not gone so far as to release the air from the tire. Consequently many tires are repaired and even retreaded which are unsuitable for further use because of undetected ply separation therein.

The primary object of my invention is the provision of a device for detecting ply separation in pneumatic tire casings which is considerably more accurate than any device heretofore produced for this purpose.

A further object of my invention is the provision of a device of the class described which may be operated with a minimum of skill and with a minimum of labor.

A further object of my invention is the provision of a device of the class described which is not unduly expensive to produce, which has a minimum of working parts and which is rugged and durable.

The above and still further objects of my invention will become apparent from the following detailed specification, appended claims, and attached drawings.

Referring to the drawings, wherein like characters indicate like parts throughout the several views:

Fig. 1 is a view in side elevation of my novel structure;

Fig. 2 is a view in front elevation;

Fig. 3 is a view in vertical section as seen from the line 3—3 of Fig. 1, some parts being broken away;

Fig. 4 is an enlarged fragmentary view in section as seen substantially from the line 4—4 of Fig. 2;

Fig. 5 is an enlarged fragmentary sectional view as seen from the line 5—5 of Fig. 1;

Fig. 6 is a view in side elevation of the structure of Fig. 5, on a slightly reduced scale; and Fig. 7 is an enlarged fragmentary sectional view taken on the line 7—7 of Fig. 2.

Referring with greater particularity to the drawings, the numeral 1 indicates in its entirety a rigid shell of suitable metal or the like defining a relatively air-tight inspection chamber 1a. Opposite side walls 2 of the shell 1 are formed to provide transparent portions, preferably and as shown in the nature of bubbles 3 formed from glass or transparent plastic material, and suitably sealed along their peripheral edge portions 4. The front wall 5 of the shell 1 is formed to provide a pressure-tight door 6 for the insertion and removal of pneumatic tire casings A into the chamber 1a, the hinges thereof being identified by the numeral 7 and the releasable latching mechanism by the numeral 8.

Extending between the side walls 2 of the shell 1 in the lower end portion of the chamber 1a and journalled for rotation in said walls 2 is a pair of laterally spaced horizontally disposed parallel rollers 9 and 10 which are tied together for common rotation by means of an endless chain or the like 11 entrained over sprockets, not numbered but fast on said rollers 9, 10. As shown particularly in Fig. 1 the rollers 9, 10 are preferably longitudinally concave so as to keep pneumatic tire casings A supported thereon, as shown in Fig. 1, centered with respect thereto when said casings A are rotated through the medium of a crank 12 projecting through the side walls 2 and associated with the roller 9.

When a given tire casing A is placed upon the supporting rollers 9, 10 within the chamber 1a, said casing A is maintained in an upright position by means of opposed rollers 13 secured to the side walls 2 of the shell 1 through the medium of arms 14. As shown particularly in Figs. 5 and 6 the angularly disposed outer ends 15 of the arms 14 are received in bearing brackets 16 fast on the walls 2; and said arms 14 are biased toward engagement with each other and toward engagement with the opposed side walls 17 of the tire casing A by means of coil torsion springs 18.

Also suitably secured to the shell 1 within the chamber 1a are one or more light bulbs 19, or other such source of light, preferably and as shown focused as to throw light in the direction of the supporting rollers 9, 10 to facilitate inspection of the interior of the lower portion of a tire casing A supported on said rollers. To facilitate inspection suitable circumferentially spaced spreader elements 20 are provided to maintain the beads 21 of the tire casing A in a laterally spaced relationship as shown particularly in Fig. 3.

Suitable means such as a cooperating cylinder 22 and piston 23 is provided for creating a partial vacuum within the chamber 1a during inspection of a tire casing A supported therein as shown in Figs. 1 and 3. As shown, the lower end of the cylinder 22 is connected by a suitable conduit 24 to the interior of shell 1, a check valve 25 preferably being inserted in said conduit 24. Lifting movements are imparted to the piston 23 for the purpose of creating the partial vacuum within the chamber 1a through the medium of conventional air motors 26 on opposite sides of the cylinder 22, the plunger rods 27 of said motors 26 being connected to opposite ends of a crosshead 28 carried by the upper end of the piston rod 29 associated with the piston 23.

When a given tire casing A is placed within the inspection chamber 1a, as shown in Fig. 3, and subjected to a partial vacuum, by means immediately above explained, if there are any areas of separation between the several plies of the carcass thereof, said areas will be readily detected due to the bubbles or raised areas X which are formed either interiorly or exteriorly of the casing as the air trapped between said plies expands within the partial vacuum. Obviously such areas are readily detectable as the casing A is rotated through the medium of the cranks 12, as the observer looks downwardly through the transparent bubbles 3 between the heads 21 of the casing A and the exterior side walls 17 thereof.

My invention has been thoroughly tested and found to be completely satisfactory for the accomplishment of the above objects, and while I have disclosed a single form of my invention, I wish it to be understood that same is capable of modification without departure from the scope and spirit of the appended claims.

What I claim is:

1. A device for detecting ply separation in pneumatic tire casings comprising structure defining a rigid relatively air-tight tire inspection chamber having transparent side wall portions, the front wall of said chamber defining a pressure-tight door, a pair of horizontally disposed laterally spaced tire supporting rollers mounted for rotation in the lower end portion of said chamber on axes generally normal to the planes of a tire entering said chamber through said door, means coupling said rollers together for common rotation, crank means exteriorly of said chamber for imparting rotation to said rollers, means for maintaining the beads of a tire casing on said rollers in a spread condition, and means for creating a partial vacuum in said chamber.

2. A device for detecting ply separation in pneumatic tire casings comprising structure defining a door-equipped inspection chamber having transparent wall portions, a horizontally disposed roller element for supporting a pneumatic tire casing in a generally upright position in said chamber, means for imparting rotation to said roller element, means for maintaining the beads of a tire casing on said roller element in laterally spread condition, and means for creating a partial vacuum in said chamber.

References Cited in the file of this patent

UNITED STATES PATENTS

| | | |
|---|---|---|
| 2,345,679 | Linse | Apr. 4, 1944 |
| 2,453,338 | Pajak | Nov. 9, 1948 |
| 2,694,924 | Matlock et al. | Nov. 23, 1954 |